United States Patent [19]

Machon

[11] 3,967,762
[45] July 6, 1976

[54] PUMP FOR DISPENSING LIQUID FROM A CONTAINER IN A GENERALLY CONTINUOUS MANNER

[75] Inventor: Charles S. Machon, Woodbury, Conn.

[73] Assignee: The Risdon Manufacturing Company, Naugatuck, Conn.

[22] Filed: Apr. 16, 1975

[21] Appl. No.: 568,515

[52] U.S. Cl. .............................. 222/321; 222/341; 222/384; 417/534; 417/544
[51] Int. Cl.² ........................................ G01F 11/02
[58] Field of Search ........... 222/321, 341, 384, 385; 417/534, 544

[56] References Cited
UNITED STATES PATENTS

| | | | |
|---|---|---|---|
| 2,175,947 | 10/1939 | Teeple | 417/534 X |
| 2,301,051 | 11/1942 | King | 222/321 |
| 2,567,496 | 9/1951 | Pittenger | 222/321 X |
| 2,772,031 | 11/1956 | Roselund | 222/385 X |

*Primary Examiner*—Robert B. Reeves
*Assistant Examiner*—Frederick R. Handren

[57] ABSTRACT

A finger operable pump for dispensing liquid from a container in a generally continuous manner includes a pump housing having an inner pump body and an outer sealing element. The inner pump body has a liquid receiving chamber, divided into primary and secondary portions by a reciprocatable piston, and an inlet conduit to the primary chamber portion. The inner pump body further includes first and second lead passages that respectively communicate with the primary and secondary chamber portions. The outer surface of the inner pump body is recessed to form a channel interconnecting the first and second lead passages, and an air dome communicating with the channel that is designed to confine air as a pressure head above liquid flowing through the channel. The outer sealing element is shaped and sized to tightly nest about the inner pump body and seal the channel and the air dome. The piston is part of a plunger assembly which also comprises a hollow piston rod extending out of the pump housing and defining an outlet conduit that communicates from the secondary chamber portion to atmosphere.

6 Claims, 8 Drawing Figures

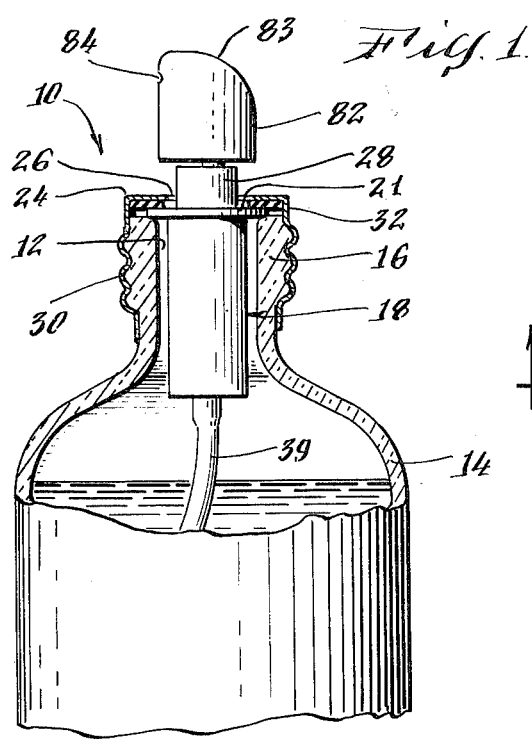
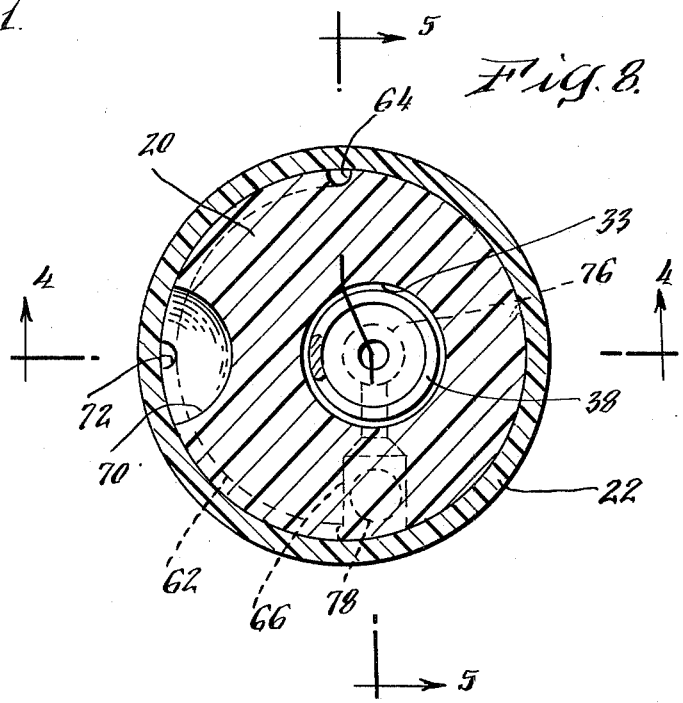
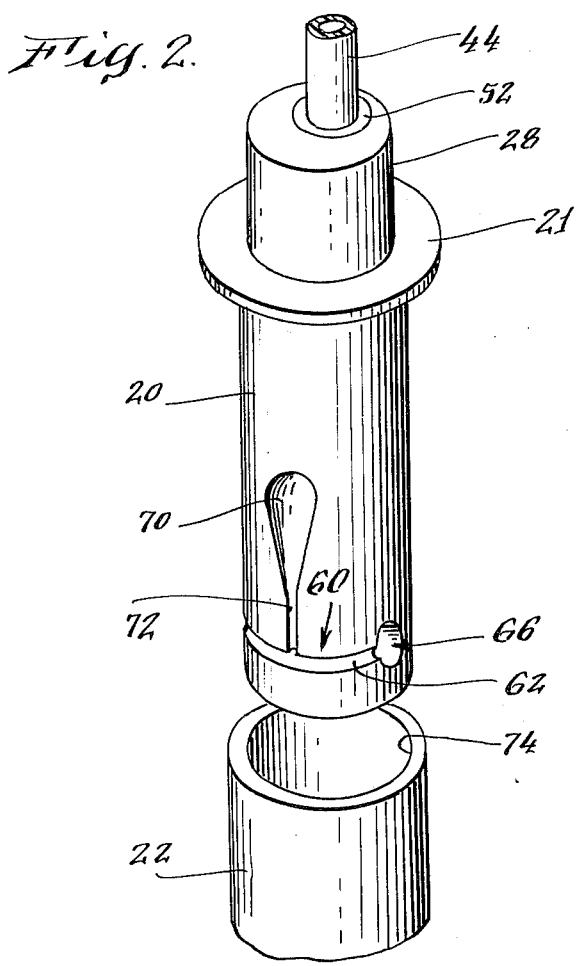
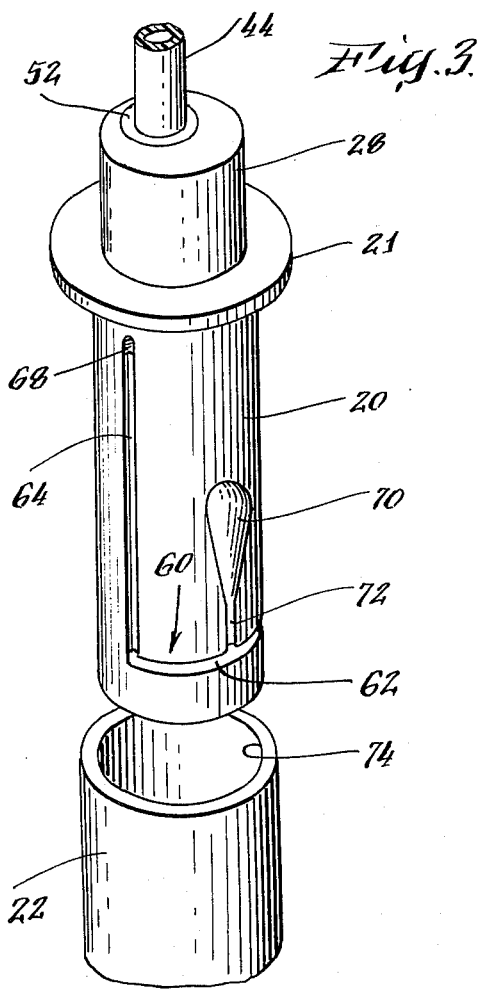

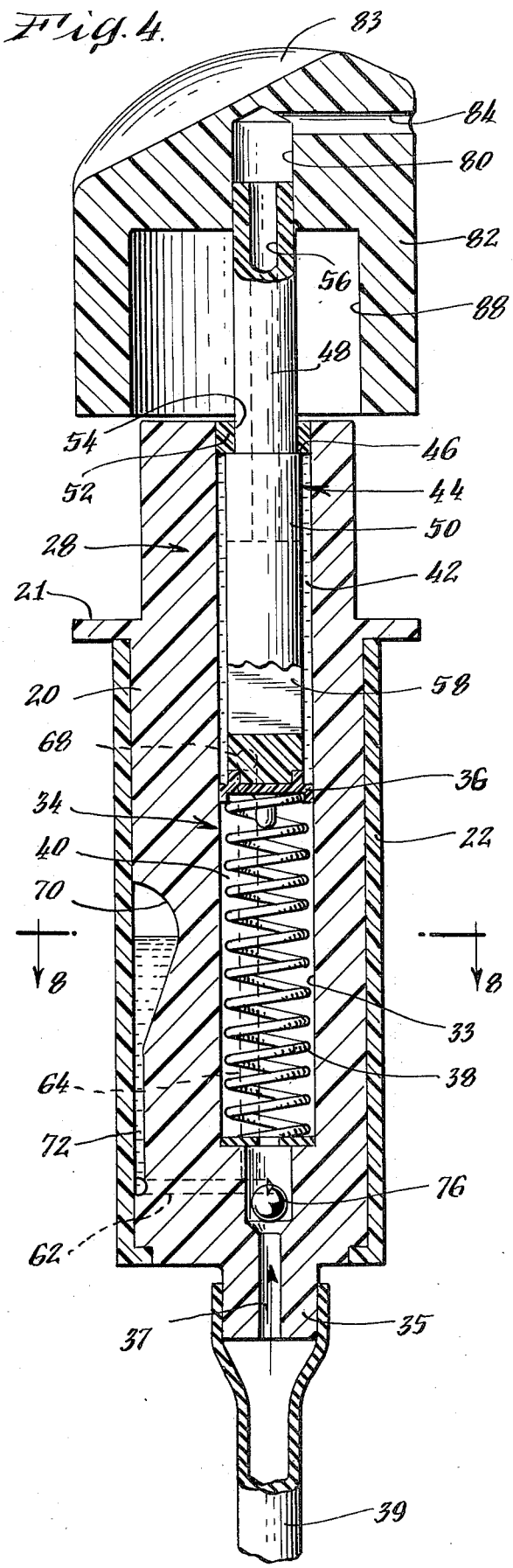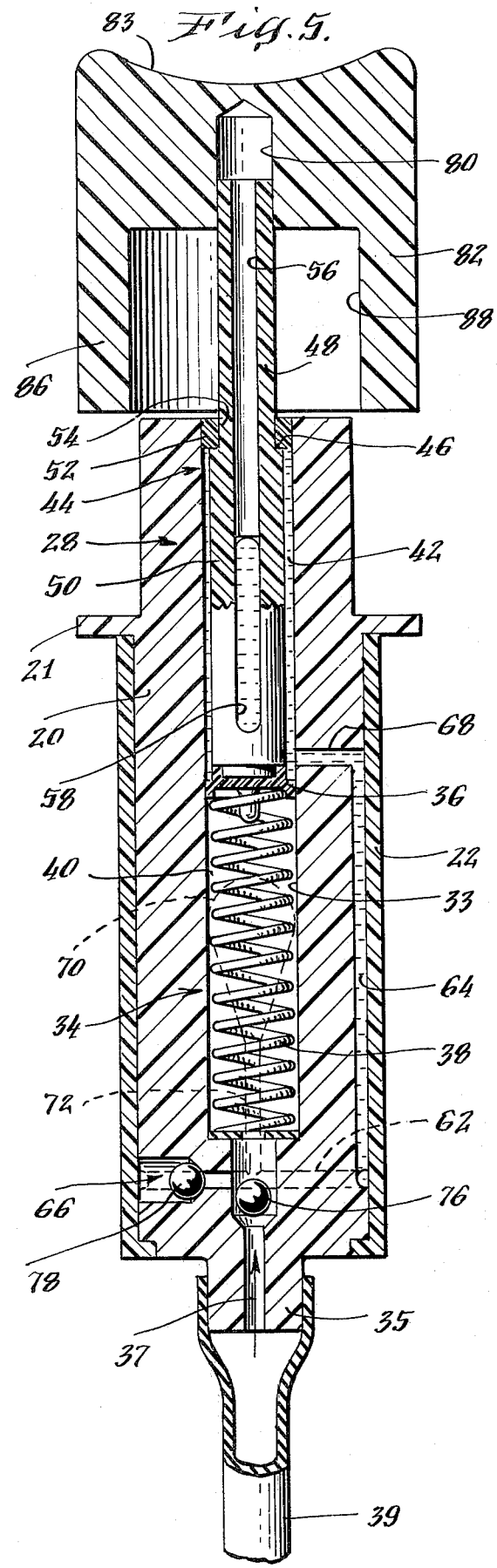

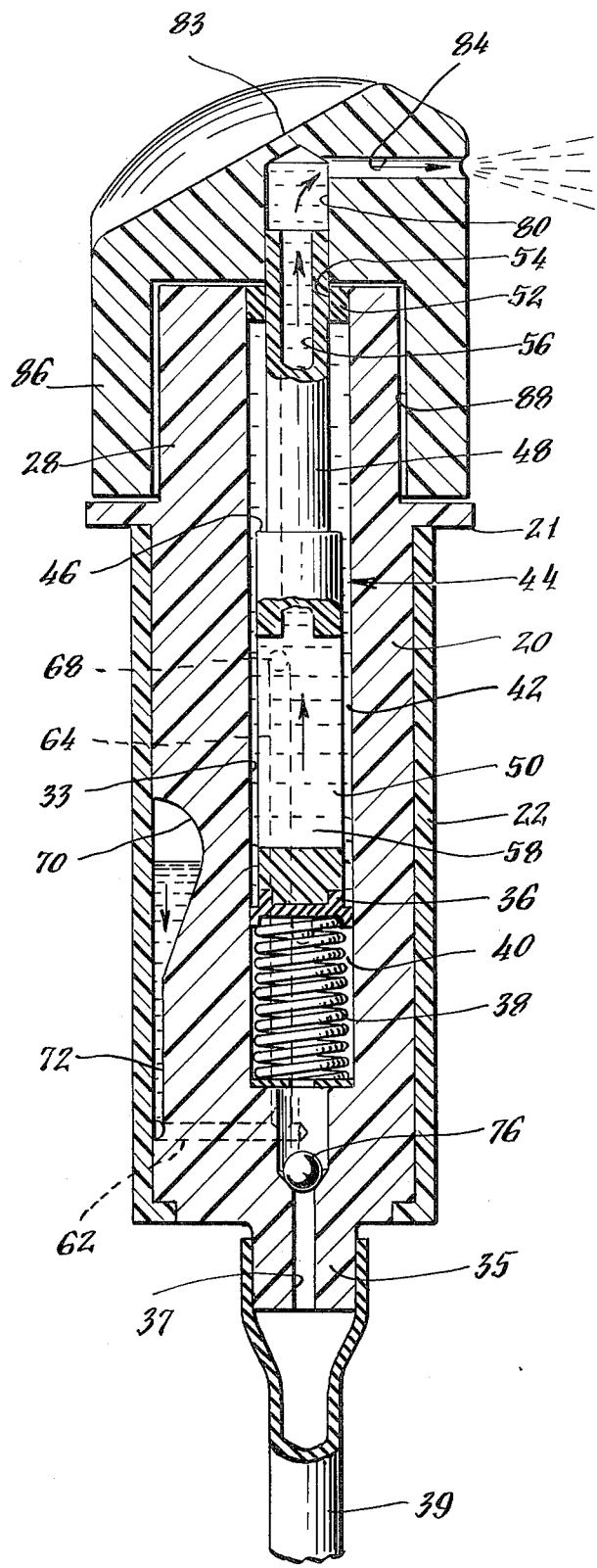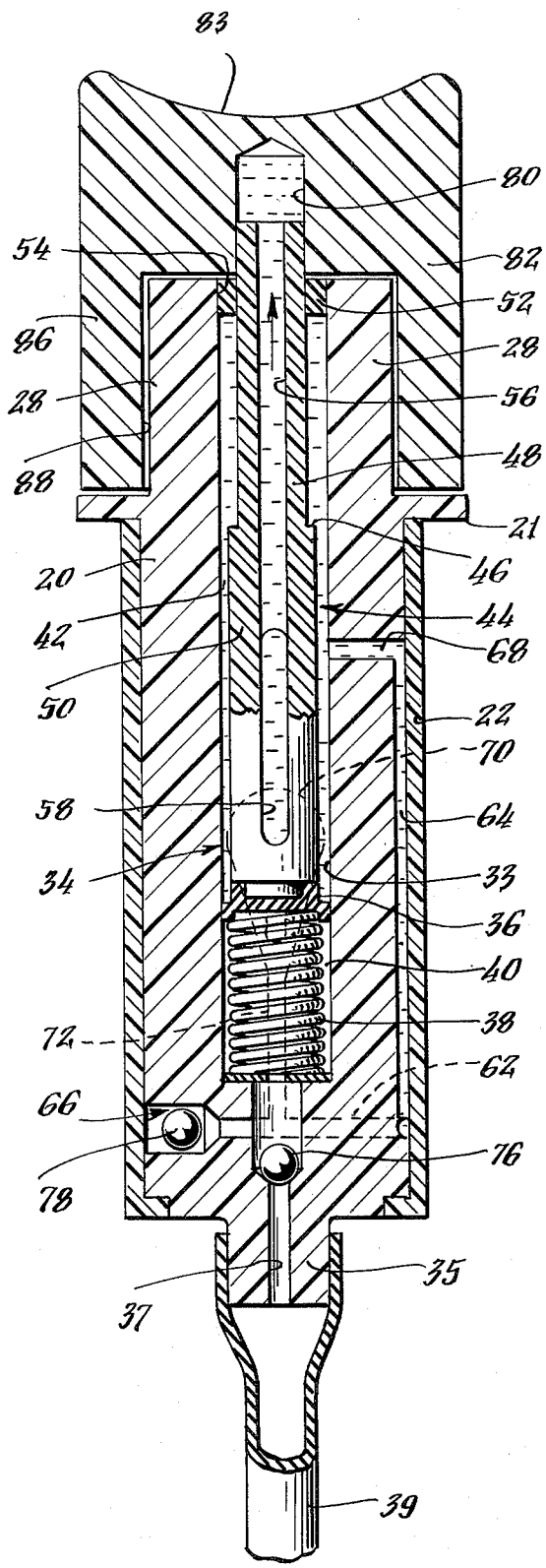

PUMP FOR DISPENSING LIQUID FROM A CONTAINER IN A GENERALLY CONTINUOUS MANNER

BACKGROUND OF THE INVENTION

1. Field of the Invention

The present invention relates to a finger operable pump that is capable of dispensing liquid from a container in a substantially continuous manner.

Finger operable pumps are frequently installed on portable, non-pressurized containers for intermittent use to dispense consumer liquid products such as window and all-purpose cleaners, polishes, lubricants, pesticides, room deoderizers and personal products such as hair setting lotions, hair spray, antiperspirants and perfumes. The containers are adapted to be hand-held and the pump is adapted to be operated by one of the user's fingers on the same hand.

These pumps and the containers on which they are installed are often intended to be thrown away when the contents of the container have been exhausted. Therefore, the pumps should be mechanically simple and have components that are made from inexpensive materials. These components should further be easy to assemble in order to make the pump and container package economically feasible.

Additionally, it is desirable to dispense some liquid products in a substantially continuous manner. For example, it is desirable to apply hair setting lotion and hair spray to the hair in a continuous mist. Similarly, it is desirable to apply certain polishes such as furniture polish in a continuous mist.

2. Description of the Prior Art

Finger operable pumps used with disposable containers of liquid products are presently known.

However, certain prior finger operable pumps which are capable of providing a continuous product discharge are mechanically complicated or difficult to operate. For example, U.S. Pat. No. 3,741,065 (Malone) discloses a liquid pump that employs a separate air pump to develop air pressure in a head space above liquid in a container. When dispensing is desired, a separate actuator button is pressed to allow release of the product.

U.S. Pats. Nos. 3,733,010 (Riccio) and 3,733,031 (Marand) disclose pumps with pistons which develop an air pressure head during a piston down stroke. The air pressure is suddenly released at the end of this down stroke by tripping a release valve. The resulting spurt of high pressure air is conducted through a venturi to aspirate fluid stored in the container.

U.S. Pat. No. 3,211,346 (Meshberg) discloses an aerosol package in combination with a piston pump designed to effect a spray discharge. Liquid is fed to a chamber by aerosol pressure and is then forced by a mechanical piston through a discharge nozzle.

Examples of other liquid dispensing pumps are disclosed in U.S. Pat. Nos. 3,452,905 (Miscallef); 3,255,933 (Martin); 3,162,372 (Viard); and 3,161,329 (Fedit et al).

SUMMARY OF THE INVENTION

In a preferred embodiment of the present invention to be described below in detail, the finger operable pump for dispensing liquid from a container in a substantially continuous manner comprises a pump housing that has an inner cylindrical pump body and an outer cylindrical sealing element. The inner pump body has a liquid receiving chamber, which is divided into primary and secondary portions by a piston mounted for reciprocal pumping movement in this chamber. An inlet conduit communicates with the primary chamber portion to enable liquid to enter therein. First and second lead conduits are disposed in the inner pump body side cylindrical wall to respectively communicate with the primary and secondary chamber portions. The outer cylindrical surface of the inner pump body is formed with a channel that interconnects the first and second lead conduits, and an air dome that communicates with the channel. The air dome is located to confine air as a pressure head above liquid flowing through the channel.

The outer cylindrical sealing element is shaped and dimensioned to tightly nest about the inner pump body and seal the channel and the air dome. In this way, a continuous passage that communicates with a sealed air dome is formed exteriorly of the liquid receiving chamber to bypass the piston and interconnect the primary and secondary chamber portions.

The piston is part of a plunger assembly that also includes a hollow piston rod, mounted on the piston, extending out of the pump housing and having an outlet conduit therethrough that communicates from the secondary chamber portion above the piston to atmosphere.

When moved in pumping strokes toward the bottom of the primary chamber portion by depressing the piston rod, the piston forces liquid from the primary chamber portion, through the sealed channel, into the secondary chamber portion to be discharged through the outlet conduit. Simultaneously air is pressurized as a pressure head in the air dome above liquid flowing through the channel. When each pumping stroke is complete, or during a return stroke of the piston away from the bottom of the primary chamber portion, air pressurized in the air dome acts to maintain the flow of liquid in the feed channel and secondary chamber portion to the outlet conduit during the recovery cycle of the pump piston.

Furthermore, the piston is double acting and acts with the pressurized air in the air dome to discharge liquid through the outlet conduit during each return stroke.

Appropriate double-acting check valves in the primary chamber portion and in the sealed channel downstream of its communication with the air dome enable liquid to be discharged during the piston pumping and return strokes as described above.

The pump of the present invention also incorporates a child-proof feature requiring multiple component movements to actuate the pump from a locked position.

The pump of the present invention provides several advantages. It is operable to produce a more continuous spray discharge of the liquid contents of a portable handheld container during reversal of piston travel. The pump components may be simply manufactured from inexpensive materials. The nested cylindrical inner pump body and outer sealing body configuration facilitates simply assembly of these components to form the air dome and continuous sealed channel construction.

Accordingly, it is an object of the present invention to provide a finger operable liquid dispensing pump which is feasible to make and install on disposable containers and which can be operated to substantially continuously dispense the liquid contents of such containers.

Other objects, aspects, and advantages of the present invention will be pointed out in, or will be understood from the detailed description provided below, considered with the following drawings.

BRIEF DESCRIPTION OF THE DRAWINGS

FIG. 1 is a view, partly in cross-section, showing the preferred embodiment of the liquid dispensing pump of the present invention installed on a container;

FIG. 2 is a partial, exploded, perspective view of this pump illustrating the inner cylindrical pump body and outer cylindrical sealing body before being nested together;

FIG. 3 is a similar partial, exploded, perspective view of this force pump shown with the inner pump body rotated slightly to illustrate additional detail;

FIG. 4 is an enlarged vertical cross-sectional view taken on plane 4—4 in FIG. 8 illustrating the plunger assembly in its normal extended position;

FIG. 5 is an enlarged vertical cross-sectional view taken through discontinuous plane 5—5 in FIG. 8 illustrating the double acting check valves in greater detail;

FIG. 6 is an enlarged vertical cross-sectional view similar to that shown in FIG. 4 illustrating the plunger assembly in its depressed position;

FIG. 7 is an enlarged vertical cross-sectional view similar to that shown in FIG. 5 again illustrating the plunger assembly in its depressed position; and FIG. 8 is a horizontal cross-sectional view taken through plane 8—8 in FIG. 4.

DETAILED DESCRIPTION OF THE PREFERRED EMBODIMENT

In FIG. 1 the finger operable liquid dispensing pump, constructed in accordance with the preferred embodiment of the present invention and generally indicated at 10, is shown mounted in the mouth 12 of a container in the form of a bottle 14 having a threaded neck 16. The threaded neck serves as a means for attaching the pump 10 to the bottle 14.

The pump 10 comprises a pump housing 18 that includes an inner cylindrical pump body 20 and an outer cylindrical sealing element 22 (FIGS. 2 and 3) assembled in telescoping fashion as will be described in greater detail below. The inner pump body is formed with radially outwardly projecting flange 21. An overcap 24, having an aperture 26 which fits around an upstanding cylindrical rim 28 of inner pump body 20, further has a threaded depending skirt 30 adapted to engage the threaded bottleneck 16 and press flange 21 against the top 32 of bottleneck 16. Other suitable closure constructions such as snap caps may be employed to install the pump 10 on a container.

As can be seen in FIGS. 4 through 7, inner pump body 20 is formed with a generally axially extending bore 33 that forms a liquid receiving chamber 34. A tailpiece 35, formed on the bottom of inner pump body 20, has an inlet conduit 37 therethrough which enables liquid to enter liquid receiving chamber 34. A dip tube 39 is connected to tailpiece 35 and extends to the bottom of the container to conduct liquid to the pump.

A piston 36, which is part of a plunger assembly, is reciprocally mounted in the liquid receiving chamber 34 and makes a sliding piston fit against the wall of the inner bore 33. The piston 36 is biased to a "home" position (FIGS. 4 and 5) opposite a depressed position (FIGS. 6 and 7) by a coil spring 38 compressed between the piston 36 and the bottom of the liquid receiving chamber 34. Further, the piston divides liquid receiving chamber 34 into a lower primary portion 40 and an upper secondary portion 42.

As shown in FIGS. 4 and 7, the plunger assembly also includes a hollow piston rod 44 mounted on piston 36 and extending outwardly of the pump housing 18. A shoulder 46 is formed on the outer surface of piston rod 44 at the juncture of reduced and enlarged diameter rod portions 48 and 50. A closure ring 52 is mounted in the mouth of liquid receiving chamber 34 and has an aperture 54 which accepts the reduced diameter piston rod portion 48. Closure ring 52 retains the plunger assembly in the pump housing by serving as a stop against which shoulder 46 abuts.

Piston rod 44 further has an axial outlet conduit 56 which terminates at its lower end in a transverse slot 58 that communicates with the secondary chamber portion 42 above piston 36.

Referring now to FIGS. 2 and 3, the outer surface of the pump body 20 is formed with a channel 60, having a circumferentially extending leg 62 and a generally axially extending leg 64. As shown in greater detail in FIGS. 5 and 7, a first lead passage 66 connects the circumferentially extending channel leg 62 with the primary chamber portion 40. A second lead passage 68 connects the axially extending leg 64 with the secondary chamber portion 42.

An air dome 70 is also formed on the outer surface of the inner pump body 20 and has a passage 72 which communicates with the channel 60 intermediate first and second lead passages 66 and 68. The air dome 70 is located to trap air as a pressure head above liquid flowing through channel 60. The inner pump body may be formed with the channel 60, airdome 70, and passage 72 by various inexpensive molding techniques. For example, it may be formed by injection molding suitable polymer material.

The inner pump body 20 is nested tightly within a hollow bore 74 of the outer sealing element 22 to complete the pump housing 18. The outer sealing element bore 74 is shaped and dimensioned to enclose and seal the channel 60 to form a continuous passage which passes around piston 36 exteriorly of liquid receiving chamber 34 and communicates between the primary chamber portion 40 and secondary chamber portion 42. Moreover, the outer sealing element bore 74 is shaped and dimensioned to enclose and seal air dome 70 and passage 72 communicating with channel 60.

A tight seal between the outer surface of the inner pump body and outer sealing element bore 74 may be achieved by, for example, an adhesive coating, ultrasonic welding, O-ring packing or by making the outer sealing element from a heat shrinkable material which is shrunk after the inner pump body is nested therein.

Appropriate double-acting ball check valves 76 and 78 are mounted respectively in the inlet conduit 37 and in the channel 60 downstream of the channel communication with air dome passage 72. These ball check valves prevent backflow of liquid in a conventional manner.

As shown in FIGS. 4 through 7, the piston rod 44 is pressfitted into a piston rod socket 80 disposed in an actuator button or nozzle body 82. This button is provided with a discharge orifice 84 communicating with the piston rod socket 80 and outlet conduit 56, and has a finger depression 83 on its upper surface to facilitate finger actuation.

The finger operable liquid dispensing pump 10 is also provided with a locking feature to discourage its actuation by unauthorized users such as small children. In particular, as shown in FIGS. 4 through 7, button 82 is formed with a depending skirt 86 defining a cylindrical cavity 88 adapted to accept in telescoping fashion the upwardly projecting cylindrical inner pump body rim 28 when registered therewith. As best seen in FIGS. 4, 6 and 8, the piston rod 44 is mounted in pump housing 18 with its axis parallel to but offset from the central axis of the pump. Similarly, the button 82 is mounted on piston rod 44 with the axis of the cylindrical cavity 88 parallel to but offset by a similar amount from the axis of the piston rod. Thus, when the nozzle and piston are rotated about the axis of the pump chamber to a position where the cavity and cylindrical rim axes are substantially coincident, the rim 28 may be accepted in telescoping fashion by the cavity 88, permitting the button and, hence, the piston to be depressed as shown in FIGS. 5 and 7. However, if the button is rotated to a position where the axes of the cavity and the cylindrical rim are not coincident, the skirt 86 is positioned to abut the rim, prevent depression of the nozzle, and operation of the pump. Therefore, the piston and actuator button assembly must be rotated to bring the button cavity into proper alignment with the cylindrical rim to permit depression.

The finger operable liquid dispensing pump 10 is operated as follows. The pump is first unlocked by rotatively registering cavity 88 with rim 28 as just described. Piston 36 is then depressed successively by finger actuation of button 82 against the bias of the return spring 38. Fluid is drawn past check valve 76 into the primary chamber portion 40 of the pump and is forced through channel 60 past the second check valve 78, arriving ultimately in the secondary chamber portion 42. From there it passes through port 58 of piston rod 44 and out through conduit 56 to be discharged to atmosphere through orifice 84 of the acutator button. In the course of this pumping action, air trapped in dome 70 is successively compressed and allowed to expand, acting as a pressure accummulator or air cushion. The air head thus produced tends to maintain fluid flow during the intervals occurring where the piston travel is reversed. Flow during the periods where the piston is moving downward or upward in the pumping chamber will be maintained by the double-acting effect of the piston, already mentioned. Therefore, once the pump is primed so that the primary and secondary portions of liquid receiving chamber 34 are filled, repeated operation of the piston through pumping and return strokes creates a substantially continuous discharge of liquid.

As hereinabove illustrated and described, the pump cylinder and piston represent a simplified arrangement wherein the primary and secondary pumping chambers are of the same diameter throughout the pump. In some instances, for example to assist in the break-up of the liquid being dispensed as a fine mist by the discharge orifice in the actuator button, a stepped cylinder, i.e. one in which the primary portion is somewhat smaller in diamter than the secondary portion, has proven to be of advantage. In such case, however, a second piston configured to the larger diameter secondary cylinder portion, must be fitted on the piston rod, spaced axially outwardly thereon from the primary piston.

The construction of the liquid dispensing pump of the present invention provides several advantages, in addition to improving the continuity of liquid discharge during pumping cycles. In particular, the nested inner pump body and outer sealing element assembly facilitates inexpensive manufacture and assembly of these components to produce the channel and air dome configuration. The eccentric locking feature, moreover, discourages unauthorized use and advantage is also taken of the eccentricity of the pumping chamber of the pump by locating the air dome in that region of the housing wall which is thickest, thus enabling the formation of a dome of larger capacity than would otherwise be feasible.

Although the present invention has been disclosed in detail above with reference to the particular structure shown in the drawings, it is to be understood that this is merely for purposes of illustration. The invention may accordingly take other specific forms since it is apparent that many changes can be made to the described structure by those skilled in the art in order to adapt this hand-held liquid dispensing force pump to a particular application.

What is claimed is:

1. A finger operable pump for dispensing liquid from a container in a generally continuous manner, said pump comprising:
   1. a pump housing including
      a. an inner pump body, and
      b. an outer sealing element, said inner pump body having:
         i. a liquid receiving chamber divided into primary and secondary chamber portions,
         ii. an inlet conduit for enabling liquid to be conducted from the container to said primary chamber portion,
         iii. an outer surface formed with a channel and an air dome communicating with said channel and located to confine air as a pressure head above liquid flowing in said channel,
         iv. a first lead passage communicating between said primary chamber portion and said channel, and
         v. a second lead passage communicating between said channel and said secondary chamber portion,
      said outer sealing element being dimensioned and shaped to tightly nest about said inner pump body and seal said channel and said air dome,
   2. a plunger assembly including,
      a. a piston mounted in said liquid receiving chamber for reciprocal pumping movement, said piston dividing said liquid receiving chamber into said primary and secondary chamber portions, and
      b. a hollow piston rod mounted on said piston extending out of said pump housing and defining an outlet conduit communicating between atmosphere and said secondary chamber portion, and
   3. valve means located to enable said piston to pump liquid from said primary chamber portion through said channel, into said secondary chamber portion to be dispensed through said outlet conduit and to pressurize air in said air dome, and further to enable said air pressurized in said air dome to force liquid through said channel, into said secondary chamber portion to be dispensed through said outlet conduit.

2. The finger operable pump for dispensing liquid from a container in a generally continuous manner as claimed in claim 1 wherein said inner pump body is cylindrical and said channel includes a circumferentially extending leg and a generally axially extending leg.

3. The finger operable pump for dispensing liquid from a container in a generally continuous manner as claimed in claim 2 wherein said air dome communicates with said circumferentially extending channel leg intermediate the locations of the channel communication with said first and second lead passages.

4. The finger operable pump for dispensing liquid from a container in a generally continuous manner as claimed in claim 1 wherein said piston is double acting to pump liquid from said primary chamber portion through said channel, into said secondary chamber portion to be dispensed through said outlet conduit during both pumping strokes, and wherein air pressurized in said air dome during one of said pumping strokes tends to maintain liquid discharge during intervals of piston travel reversal in the pumping cycle.

5. The finger operable pump for dispensing liquid from a container in a generally continuous manner as claimed in claim 1 further comprising:

an actuator button mounted on said outwardly extending piston rod having a discharge orifice communicating with said outlet conduit for directing said liquid discharged by said pump.

6. The finger operable pump for dispensing liquid from a container in a generally continuous manner as claimed in claim 5, wherein said inner pump body has a cylindrical rim projecting outwardly of said pump housing in encircling relation about said piston rod, said piston rod being mounted in said pump housing with its axis offset with respect to the axis of said cylindrical rim; and wherein said nozzle has a depending skirt that defines a cylindrical cavity adapted to accept, in telescoping fashion, said cylindrical rim when registered therewith to permit depression of said piston and operation of said pump, said depending skirt being adapted to block depression of said piston by abutting said cylindrical rim when said cylindrical cavity is not registered therewith, said piston rod and actuator button being mounted for rotation relative to said cylindrical rim to move said cylindrical cavity to and from registered position with said cylindrical rim.

* * * * *